United States Patent Office 3,152,110
Patented Oct. 6, 1964

3,152,110
ISOTHIURONIUM SALTS OF BROMOHYDRIN SULFIDE DYESTUFFS
David Taber, Pittsburgh, and Edgar E. Renfrew and Henry W. Pons, Monroeville, Pa., assignors to American Aniline Products, Inc., a corporation of Maryland
No Drawing. Filed Dec. 18, 1961, Ser. No. 160,329
5 Claims. (Cl. 260—144)

This invention relates to new dyestuffs and to the coloring of cellulosic and other textile materials therewith. In one specific aspect, it relates to new water-soluble dyestuffs having attached thereto at least one isothiuronium salt of a bromohydroxyalkylthio group.

In recent years there has been considerable interest in the manufacture of water-soluble dyestuffs containing triazine or pyrimidine rings to which there are attached reactive halogen atoms. These classes of dyestuffs are believed to react with the functional groups of cellulosic and other fibers and, as a result, give colorations which are extremely resistant to wet treatments. The dyestuffs must contain at least one ionogenic solubilizing group, e.g., a sulfonic acid or carboxylic acid group, to make them sufficiently water-soluble to be applied from an aqueous bath. The requirement for at least one sulfonic acid or carboxylic acid group thus imposes a limitation on the type of colored compound that can be used to synthesize the dyestuffs.

We have found that unexpectedly superior water-soluble dyestuffs can be made from water-insoluble dyestuffs, free of ionogenic solubilizing groups, by converting water-insoluble dyestuffs, containing at least one bromohydroxyalkylthio group, to isothiuronium salts. Our new dyestuffs, when applied to cellulose or other textiles by dyeing or printing in the presence of an acid-binding agent, give bright colorations which have good wash fastness.

It is therefore an object of the present invention to provide a new class of water-insoluble dyestuffs solubilized by the presence of at least one isothiuronium salt of a bromohydroxyalkylthio group.

In accordance with the invention we have discovered dyestuffs of the formula:

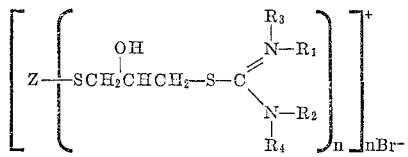

wherein Z is a water-insoluble colored moiety of the azo, anthraquinone, phthalocyanine or nitro series as recognized by the Colour Index, 2nd edition, 1956; $n$ is a small whole number having a value of from 1 to 4; $R_1$ and $R_2$, as individual substituents, are members selected from the group consisting of hydrogen and lower alkyl and, taken collectively, represent an alkylene bridge having from 2–3 carbon atoms, said bridge connecting the N atoms to which $R_1$ and $R_2$ are attached; and $R_3$ and $R_4$ are hydrogen or lower alkyl. The Z term, representing the dyestuff moiety, is free of ionogenic solubilizing groups.

The new dyestuffs can be made by the interaction of one mole of a water-insoluble mercaptan of the azo, anthraquinone, phthalocyanine or nitro series with at least one mole of epibromohydrin per mercapto group to form a water-insoluble bromohydrin sulfide dyestuff intermediate. This intermediate is converted to its water-soluble isothiuronium salt by reacting it with a thiourea.

The water-insoluble mercaptans of the azo series which are suitable for making the dyestuffs of the invention can be made by a number of methods. One method is to diazotize a water-insoluble primary amine colorant of the azo series and react the diazonium salt with an alkali metal xanthate to form a xanthogenate. In the presence of aqueous potassium hydroxide the xanthogenate is converted to a potassium mercaptide which, in the presence of acid, gives the free mercaptan. Another method involves reacting a diazonium salt of a water-insoluble primary amine colorant with thiocyanic acid to form the thiocyanate, which can be converted to the corresponding mercaptan. Less effective alternative routes from the diazonium salts to the mercaptan involve the use of thiosulfuric acid, thiocarbonic acid and thioformic esters as intermediates. Another good method is to reduce an acylaminoaryl sulfonyl chloride to the corresponding mercaptan. Still another technique is to react an aryl nitro compound containing a reactive halogen atom with sodium sulfide, thereby forming the mercaptan. The nitro group can be reduced to a diazotizable amine at some subsequent stage in the synthesis.

The water-insoluble primary amine colorants of the azo series suitable for making the mercaptan intermediates can be made in a variety of ways. One method is to couple an arylamine, which is free of other groups convertible to amino groups, with either (1) an arylamino coupling component which accepts diazonium salts without modification, (2) an arylamine containing an amino group protected by a hydrolyzable group which can be converted to a free amine by hydrolysis, or (3) a coupling component containing a nitro group which can be reduced to an amino group after the coupling reaction.

Alternatively, arylamines containing nitro groups can be diazotized and coupled with (1) an arylamino coupling component which accepts diazonium salts without modification, (2) an arylamine containing an amino group protected by a hydrolyzable group, (3) a coupling component free of amino groups, or (4) a coupling component containing a nitro group which can be reduced to an amino group after the coupling reaction. The nitro groups are then reduced to amino groups to form colorants useful in the invention.

Still a further method involves diazotizing arylamines containing acylamido groups and coupling them with (1) an arylamino coupling component which accepts diazonium salts without modification, (2) an arylamine containing an amino group protected by a hydrolyzable group, (3) a coupling component free of amino groups, or (4) a coupling component containing a nitro group which can be reduced to an amino group after the coupling reaction. Hydrolysis of the acylamido group or groups gives the starting materials useful in the invention.

Water-insoluble amines, free of other groups convertible to amino groups, from which diazo compounds can be made include, but are not limited to, aniline,
o-, m- and p-toluidine,
2,4- and 2,5-xylidine,
o-, m- and p-anisidine,
o-, m- and p-phenetidine,
o-, m- and p-chloroaniline,
o-, m- and p-bromoaniline,
o-, m- and p-fluoroaniline,
2,4- and 2,5-dichloroaniline,
trichloroaniline,
1-naphthylamine,
2-naphthylamine,
5-aminotetralin,
6-aminotetralin,
2-methyl-1-naphthylamine,
3-methyl-1-naphthylamine,
4-methyl-1-naphthylamine,
5-methyl-1-naphthylamine, 6-methyl-1-naphthylamine,
7-methyl-1-naphthylamine,
8-methyl-1-naphthylamine,
1-methyl-2-naphthylamine,
3-methyl-2-naphthylamine,
4-methyl-2-naphthylamine,
5-methyl-2-naphthylamine,
6-methyl-2-naphthylamine,
7-methyl-2-naphthylamine,
8-methyl-2-naphthylamine,
2-ethyl-1-naphthylamine,
4-ethyl-1-naphthylamine,
7-ethyl-1-naphthylamine,
2,3-dimethyl-1-naphthylamine,
2,6-dimethyl-1-naphthylamine,
1,7-dimethyl-2-naphthylamine,
1,4-dimethyl-2-naphthylamine,
3,6-dimethyl-2-naphthylamine,
4-phenyl-1-naphthylamine,
6-phenyl-1-naphthylamine,
3-bromo-p-toluidine,
2-chloro-p-toluidine,
3-chloro-p-toluidine,
5-methyl-o-anisidine,
2,5-dimethoxyaniline,
2,5-diethoxyaniline,
o-, m- and p-aminophenol,
2-, 3- or 4-aminodiphenyl,
5-amino-o-toluenesulfonanilide,
monobenzoyl-o-tolidine,
monobenzoylbenzidine,
N-phenyl-1-phenylenediamine,
4,4'-diaminodiphenylamine,
N,N-diethyl-p-phenylenediamine,
N,N-dimethyl-p-phenylenediamine and
N-ethyl-p-phenylenediamine.

Useful amines bearing nitro groups which can be diazotized and coupled as described hereabove include o-, m- and p-nitroaniline,
3-, 4-, 5- or 6-nitro-o-toluidine,
2-, 3-, 4-, or 5-nitro-m-toluidine,
2,3-nitro-p-toluidine,
3-chloro-2-nitroaniline,
3-chloro-2-nitroaniline,
5-chloro-2-nitroaniline,
6-chloro-2-nitroaniline,
2-chloro-3-nitroaniline,
4-chloro-3-nitroaniline,
5-chloro-3-nitroaniline,
6-chloro-3-nitroaniline,
2-chloro-4-nitroaniline,
3-chloro-4-nitroaniline,
2-chloro-6-bromo-4-nitroaniline,
2-amino-6-nitrobenzotrifluoride,
4-methylsulfonyl-2-nitroaniline,
2-methylsulfonyl-4-nitroaniline,
2-nitro-1-naphthylamine,
3-nitro-1-naphthylamine,
4-nitro-1-naphthylamine,
5-nitro-1-naphthylamine,
6-nitro-1-naphthylamine,
7-nitro-1-naphthylamine,
8-nitro-1-naphthylamine,
1-nitro-2-naphthylamine,
3-nitro-2-naphthylamine,
4-nitro-2-naphthylamine,
5-nitro-2-naphthylamine,
6-nitro-2-naphthylamine,
8-nitro-2-naphthylamine,
8-nitro-5-aminotetralin,
7-nitro-6-aminotetralin,
4-methyl-2-nitro-1-naphthylamine,
5-methyl-2-nitro-1-naphthylamine,
7-methyl-2-nitro-1-naphthylamine,
8-methyl-2-nitro-1-naphthylamine,
4-methyl-3-nitro-1-naphthylamine,
2-methyl-4-nitro-1-naphthylamine,
5-methyl-4-nitro-1-naphthylamine,
6-methyl-4-nitro-1-naphthylamine,
7-methyl-4-nitro-1-naphthylamine,
8-methyl-4-nitro-1-naphthylamine,
2-methyl-5-nitro-1-naphthylamine,
6-methyl-5-nitro-1-naphthylamine,
7-methyl-8-nitro-1-naphthylamine,
1-methyl-4-nitro-2-naphthylamine,
4,6-dimethyl-3-nitro-1-naphthylamine,
2,6-dimethyl-4-nitro-1-naphthylamine,
4-phenyl-2-nitro-1-naphthylamine,
3-chloro-2-nitro-1-naphthylamine,
3-bromo-2-nitro-1-naphthylamine,
4-chloro-2-nitro-1-naphthylamine,
4-bromo-2-nitro-1-naphthylamine,
5-bromo-2-nitro-1-naphthylamine,
4-chloro-3-nitro-1-naphthylamine,
4-bromo-3-nitro-1-naphthylamine,
2-chloro-4-nitro-1-naphthylamine,
2-bromo-4-nitro-1-naphthylamine,
4-bromo-4-nitro-1-naphthylamine,
8-chloro-4-nitro-1-naphthylamine,
1-chloro-5-nitro-2-naphthylamine,
1-chloro-6-nitro-2-naphthylamine,
1-chloro-8-nitro-2-naphthylamine,
2-bromo-5-nitro-2-naphthylamine,
4-bromo-6-nitro-2-naphthylamine,
4-bromo-8-nitro-1-naphthylamine,
3-bromo-1-nitro-2-naphthylamine,
6-bromo-1-nitro-2-naphthylamine,
6-bromo-1-nitro-2-naphthylamine,
1-bromo-4-nitro-2-naphthylamine,
1-bromo-5-nitro-2-naphthylamine,
1-bromo-6-nitro-2-naphthylamine,
2,4-dibromo-3-nitro-1-naphthylamine,
2,4-dibromo-5-nitro-1-naphthylamine,
2,4-dibromo-6-nitro-1-naphthylamine,
2,4-dibromo-8-nitro-1-naphthylamine,
2,4-dichloro-5-nitro-1-naphthylamine,
2,4-dichloro-6-nitro-1-naphthylamine and
4'-amino-4-nitrobenzanilide.

Among the suitable amines bearing acylamido groups that can be diazotized and coupled as described hereabove there are o-, m- and p-aminoacetanilide, 3-, 4-, 5- or 6-aminoacet-o-toluidide, 2-, 4-, or 6-aminoacet-m-toluidide, 2- or 3-aminoacet-p-toluidide, 3-, 4-, 5-, or 6-aminoacet-y-anisidides, 2-, 3-, 4-, 5- or 6-aminoacet-y-phenetidides and 2-, 3-, 4-, 5- or 6-aminoacyl-anisidides.

Among the coupling components which can be coupled with the diazonium salts listed hereabove to form the aminoazo compounds directly, there are included cresidine, 1-naphthylamine, 2-naphthylamine, 2,5-xylidine, m-toluidine, 2,5-dimethoxyaniline, 2,5-diethoxyaniline, 4-methyl-2,5-dimethoxyaniline, 3-methoxy-p-toluidine, m-phenylenediamine, 4-nitro-m-phenylenediamine, 3'-amino-p-toluenesulfono-p-toluidide, 1-(m-aminophenyl)-3-methyl-5-pyrazolone, 1-(p-aminophenyl)-3-methyl-5-pyrazolone and 3-amino-p-acetotoluidide.

Those arylamines which contain an amino group protected by a hydrolyzable group which is converted to a free amino group after hydrolysis include o-anisidino-ω-methanesulfonic acid, 1-(p-acetamidophenyl)-3-methyl-5-pyrazolone and o-toluidinemethane sulfonic acid.

Coupling components which do not contain an amino group and must therefore be coupled with either a diazonium salt bearing nitro groups or acylamido groups which can then be converted to free amino groups or with a diazonium salt having attached thereto a 2-hydroxy-3-bromopropylthio group, include phenol,
o-, m- and p-cresol,
o-, m- and p-chlorophenol,
o-, m- and p-bromophenol,
catechol,
resorcinol,
o-, m- and p-methoxyphenol,
o-, m- and p-ethoxyphenol,
o-, m- and p-dimethylaminophenol,
1-naphthol,
2-naphthol,
6-hydroxytetralin,
5-hydroxytetralin,
6-ethyl-5-hydroxytetralin,
2,6-dimethyl-1-naphthol,
4,8-dimethyl-2-naphthol,
2-, 3-, 4-, 5-, 6-, 7 or 8-methyl-1-naphthol,
3-, 4-, 5-, 6-, 7- or 8-methyl-2-naphthol,
2-, 3-, 4-, 5-, 6-, 7- or 8-chloro-1-naphthol,
3-, 4-, 5-, 6-, 7- or 8-chloro-2-naphthol,
2-, 3-, 4-, 5-, 6-, 7- or 8-bromo-1-naphthol,
3-, 4-, 5-, 6-, 7- or 8-bromo-2-naphthol,
1-anthrol,
2-anthrol,
3-hydroxy-2-naphthamide,
N-methyl-3-hydroxy-2-naphthamide,
3-hydroxy-2-naphthanilide, and those compounds of this series commonly known as naphthols (CI 37505 to CI 37580, 5-oxo-1-phenyl-2-pyrazoline-3-carboxamide,
ethyl 5-oxo-1-phenyl-2-pyrazoline-3-carboxylate,
1-(m-chlorophenyl)-3-methyl-5-pyrazolone,
3-methyl-5-pyrazolone,
3-methyl-1-phenyl-5-pyrazolone,
3-methyl-1-(p-nitrophenyl)-5-pyrazolone,
3-methyl-1-(p-chlorophenyl)-5-pyrazolone,
3-methyl-1-(m-sulfamylphenyl)-5-pyrazolone,
3-methyl-1-(m-nitrophenyl)-5-pyrazolone,
acetoacetanilide,
o-acetoacetotoluidide,
2,4-acetoacetoxylidide,
o-acetoacetanisidide,
2,5-dimethoxyacetoacetanilide,
4-chloro-2,5-dimethoxy-acetoacetanilide,
o-chloroacetanilide,
N,N-dimethylaniline,
N,N-diethylaniline,
N,N-di-n-propylaniline,
2-N-ethylanilino-3-N-ethylanilino-1,2-propandiol,
2-N-butylanilinoethanol,
2,2'-(m-chlorophenylimino)diethanol,
3-(N-2-hydroxyethyl-m-toluidino)bispropionitrile,
1-sec-butyl-1,2,3,4-tetrahydro-7-methyl-3-quinolinol,
1,2,3,4-tetrahydrobenzo[h]-quinolin-3-ol,
2,4-quinolinediol and
4-hydroxy-1-methylcarbostyril.

The above compounds containing hydroxyl groups should be coupled with a diazonium salt containing a 2-hydroxy-3-bromopropyl sulfide group in order to minimize side reactions. An example of a coupling component containing a nitro group which thereafter can be reduced is 3-methyl-1-(p-nitrophenyl)-5-pyrazolone.

The water-insoluble primary aminoazo colorants used in the invention also include those containing more than one azo group. Useful disazo compounds may be formed by the tetrazotization of an aromatic diamine containing two primary amino groups and coupling the tetrazo compound thus formed with two moles of one of the above-defined amino-bearing coupling components or with one mole of each of two of the above-defined amino-bearing coupling components or with one mole of the above-defined amino-bearing coupling components and one mole of a coupling component having no amino group. Suitable aromatic diamines include benzidine, 3,3'-dimethoxybenzidine, 3,3'-dichlorobenzidine and 4,4'-diaminostilbene. Another method of forming the disazo or polyazo amines useful in the invention involves the use of the above-described processes with aromatic amines or diamines containing azo groups.

Starting materials for the new dyestuffs of the invention containing one or more azo groups can be obtained by an alternative process involving coupling a diazonium compound with a coupling component wherein either the diazonium compound or the coupling component, or both, has attached thereto a bromohydrin sulfide group. In carrying out this alternative process, the coupling is generally effected at a temperature below about 5° C., conveniently, at a temperature between 0 and 5° C., and at as low a pH as is efficient with coupling in order to minimize side reactions.

Useful mercaptans of the anthraquinone series include, but are not limited to, 1-mercaptoanthraquinone,
2-mercaptoanthraquinone,
2-methyl-1-mercaptoanthraquinone,
3-methyl-1-mercaptoanthraquinone,
5-chloro-1-mercaptoanthraquinone,
2-amino-1-mercaptoanthraquinone,
4-amino-1-mercaptoanthraquinone,
5-amino-1-mercaptoanthraquinone,
8-piperidino-1-mercaptoanthraquinone,
1-amino-2-mercaptoanthraquinone,
3-chloro-2-amino-1-mercaptoanthraquinone,
1,4-dihydroxy-2-mercaptoanthraquinone,
1,4-dimercaptoanthraquinone,
1,5- and 1,8-dimercaptoanthraquinone,
2-methyl-1,4-dimercaptoanthraquinone,
4-amino-1,3-dimercaptoanthraquinone,
3-mercaptobenzanthrone,
2-mercapto-4,5-[1,2-anthraquinone]thiazole,
1-amino-2-mercapto-4-anilinoanthraquinone,
1-amino-2-mercapto-4-p-toluidinoanthraquinone,
1,4-diamino-2-chloro-3-mercaptoanthraquinone,
1-amino-2-mercapto-4-cyclohexylaminoanthraquinone,
4,4'-diamino-3,3'-dimercapto-1,1'-dianthrimide,
1-amino-2-mercapto-4-p-anisidinoanthraquinone,
2-acetylamido-3-mercaptoanthraquinone,
1-amino-2-mercapto-4-hydroxyanthraquinone,
1-amino-2-mercapto-4-p-(phenylanilino)anthraquinone,
1-amino-2-mercapto-4-(1-naphthylamino)anthraquinone,
1-amino-2-mercapto-4-methylaminoanthraquinone,
1-amino-2-mercapto-4-isopropylaminoanthraquinone,
1-amino-2-mercapto-4-ethylaminoanthraquinone,
1-amino-2-mercapto-4-(2-hydroxyethylamino)
  anthraquinone,
1-methylamino-4-mercaptoanthraquinone,
1-ethylamino-4-mercaptoanthraquinone,
1-cyclohexylamino-4-mercaptoanthraquinone,
1-acetamido-4-mercaptoanthraquinone,
1-propionamido-4-mercaptoanthraquinone,
1-benzamido-4-mercaptoanthraquinone,
1-(p-chlorobenzamido)-4-mercaptoanthraquinone,
6-mercapto-3-methyl-7H-dibenz-[f, ij]isoquinoline-
  2,7-(3H)-dione,
1-(a-mercapto-7-oxo-7H-benz[de]-anthracen-3-
  ylamino)-anthraquinone,
1,5-diamino-4,8-dihydroxy-3,7-dimercaptoanthraquinone,
1,8-diamino-4,5-dihydroxy-3,6-dimercaptoanthraquinone,
1,5-diamino-4,8-dimercaptoanthraquinone,
1,8-diamino-4,5-dimercaptoanthraquinone,
1,4-dihydroxy-2-mercaptoanthraquinone,
4-mercaptopyranthrone,
4,12-dimercaptopyranthrone,
x-mercaptodibenzanthrone,
x,y-dimercaptodibenzanthrone, x-mercaptoisodibenzanthrone,
x,y-dimercaptoisodibenzanthrone,
x,y-dimercaptoanthrone,
1-hydroxy-4-mercaptoanthraquinone,
1-hydroxy-2-mercapto-4-aminoanthraquinone,
1-hydroxy-2-mercapto-4-anilinoanthraquinone,
1-hydroxy-2-mercapto-4-methylaminoanthraquinone,
1-hydroxy-2-mercapto-4-cyclohexylaminoanthraquinone,
1-hydroxy-2-mercapto-4-alkyl- or aryl-amino-
 anthraquinone,
1,5-dihydroxy-2,6-dimercaptoanthraquinone,
1,8-dihydroxy-2,7-dimercaptoanthraquinone,
1-amino-2-methyl-4-mercaptoanthraquinone,
1-amino-2-ethyl-4-mercaptoanthraquinone,
1-hydroxy-2-methyl-4-mercaptoanthraquinone,
1-amino-2-methoxy-4-mercaptoanthraquinone,
6-mercapto-1,9-anthrapyrimidine,
7-mercapto-1,9-anthrapyrimidine,
6-mercapto-1,9-anthrapyrimidone,
7-mercapto-1,9-anthrapyrimidone,
4,6-dimercapto-1,9-anthrapyrimidone,
4-methylamino-2-mercaptoanthrapyrimidine and
3,3'-dimercaptoindanthrone.

In cases where reaction with amino groups with epibromohydrin may interfere with the condensation of the mercapto groups with epibromohydrin, suitable blocking groups, for example, methylenesulfonate groups, may be attached to the amino functions.

Useful compounds of the phthalocyanine series are made from the tetramercapto phthalocyanines, which are in turn made by either (1) the reduction of chlorosulfonated phthalocyanine or (2) diazotization of an aminophthalocyanine followed by reaction with an alkali metal xanthate and subsequent hydrolysis in alkaline solution. Epibromohydrin is reacted with the mercapto group or groups to give the bromohydrin sulfide-substituted phthalocyanines. Useful mercaptan intermediates of the phthalocyanine series include the 4,4',4'',4'''-tetra-mercaptophthalocyanines of aluminum, chromium, magnesium, cobalt, nickel, iron or zinc, as well as the corresponding metal-free compounds and the mono-, di- and trimercapto-substituted phthalocyanines.

Useful mercaptan intermediates of the nitro series are those made from substituted diphenylamines and phenylnaphthylamines, such as 2,4-dinitro-4-mercaptodiphenylamine, 4 - nitro - 4' - mercaptodiphenylamine, 2 - chloro-4 - nitro - 4' - mercaptodiphenylamine, 2,4,6 - trinitro - 4-nitrodiphenylamine, and the like.

Thioureas from which the isothiuronium salts of the invention can be made include thiourea, ethylene thiourea, N,N-dimethyl thiourea, N,N,N'-trimethyl thiourea, and N,N,N',N'-tetramethyl thiourea.

In preparing the dyestuffs of the invention, the desired mercaptan of the azo, anthraquinone, phthalocyanine or nitro series is reacted with at least one mole of epibromohydrin per mercapto group, as shown hereunder, to form the bromohydrin sulfide.

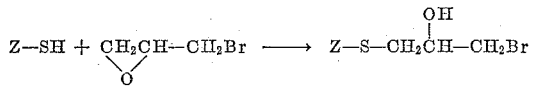

Z in the above equation has the value given aforesaid. Conveniently, the reaction is accomplished by adding to one mole of mercaptan in the absence of a solvent at least one mole of epibromohydrin per free mercapto group. The presence of activated carbon may be beneficial to the reaction, which is carried out at a temperature between 50 and 130° C. Alternatively, the reaction may be effected in alcohols in the presence of a base, such as sodium bicarbonate. The product bromohydrin sulfide may partially precipitate during the reaction and the remainder of the product can be isolated by distilling off volatile material or by dissolving the product in some suitable solvent, such as dioxane, filtering from impurities, and distilling off the volatile materials.

The isothiuronium salt is formed from the bromohydrin sulfide according to the following equation:

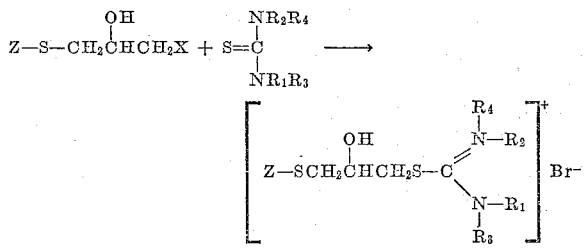

In the above equation, Z, $R_1$, $R_2$, $R_3$ and $R_4$ have the values given aforesaid. The reaction is conducted in a suitable solvent at a temperature between about 40° C. and the boiling point of the solvent. Suitable solvents include the lower alkanols, such as methanol and ethanol, and dioxane. Conveniently the reaction may be followed by testing a sample of the reaction mixture for water-solubility, the reaction having gone to completion when the sample is completely soluble. When two or more bromohydrin sulfide functions are present in the same molecule, the reaction time may be extended beyond the time when the sample is entirely soluble in water in order to be certain that all of the functions have been converted to the isothiuronium salts. Upon cooling, the product precipitates from the reaction mixture and is recovered by filtration. The dyestuff thus obtained is oven dried and is thereafter ready for use. Alternatively, the reaction can be effected with an aqueous solution of the thiourea at a temperature of from 80° C. to the boiling point of the solution. After cooling, the mixture is drowned in acetone and the precipitated product is filtered off.

The new dyestuffs of the invention are especially suited for the coloration of cellulosic textile materials such as cotton, linen and viscose rayon, although they also may be effectively applied to silk, wool, nylon and the like.

The dyestuffs are applied by treating the textile material in an aqueous solution (which may be a thickened printing paste) of the dyestuff in the presence of an acid-binding agent, for example, sodium hydroxide, sodium phosphate or sodium carbonate. The acid-binding agent may be added to the dye bath either prior to, simultaneously with, or after the addition of the dyestuff.

The dyestuff solution may contain commonly used dye bath adjuvants such as sodium chloride, sodium sulfate, sodium alginate, urea or water-soluble alkyl ethers of cellulose.

The printing paste may contain commonly used adjuvants, such as urea, and thickening agents, e.g., methyl cellulose, starch and locust bean gum and sodium alginate.

Dyeing in the presence of the acid-binding agent is preferably carried out at elevated temperatures, for example, at temperatures between 60° C. and the boiling point of the dyestuff solution, in order to improve the exhaustion and fixation of the dyestuff.

The textile material printed with printing past containing an acid-binding agent is preferably steamed or heated in order to fix the dyestuff on the textile material.

When the acid-binding agent is applied to the textile material before or after the dyestuff, it is preferably applied by treating the fiber with an aqueous solution of the acid-binding agent, i.e., a padding technique. The aqueous solutions of acid-binding agents may also contain the common dye bath adjuvants.

Both the solution of acid-binding agent and dyestuff may be applied at room temperature or at elevated temperatures. The textile material can be dried between the two treatments if desired. It is preferred to heat or steam cellulosic material at an elevated temperature, for example, at 100° C. or higher, for a short period of time after application of the dyestuff and acid-binding agent to fix the dyestuff on the textile material.

The above techniques may be modified by substituting for the acid-binding agent a substance, which on heating or steaming, generates an acid-binding agent. Such substances include alkali metal bicarbonates which on steaming yield alkali metal carbonates.

The fastness to washing or subsequent wet processing of the colorations produced using our new dyestuffs is improved by a scouring treatment, e.g., applying a hot aqueous solution of soap and sodium carbonate followed by rinsing in hot water prior to drying.

The new dyestuffs may also be applied to silk, wool, regenerated protein, nylon and modified polyacrylonitrile textile materials by using the conventional dyeing methods for those textile materials, i.e., dyeing from weakly acid dye bath solutions, for example, dyestuff solutions containing acetic acid or ammonium sulfate at a temperature above 80° C. When dyeing proteinaceous fibers in conjunction with an acidic agent, it is preferable to use a temperature between 80° C. and 100° C.

Our invention is further illustrated by the following examples:

Example I 4,4'-dimercaptoazobenzene is prepared by reacting tetrazotized 4,4'-diaminoazobenzene with potassium ethyl xanthate then hydrolyzing the ethyl xanthate so formed with dilute aqueous sodium hydroxide. Oxidation of the sodium thiophenoxide to the disulfide is prevented by the addition of a small amount of sodium sulfide to the hydrolysis mixture. The free thiophenol is liberated upon acidification.

A mixture of 24.6 g. (0.10 mole) of 4,4'-dimercaptoazobenzene and 37.4 (0.20 mole) of epibromohydrin is heated for six hours in a bath maintained at 130° C. After cooling, the solid is washed with petroleum ether and dried at 50° C. under vacuum.

A mixture of 10.4 g. (0.010 mole) of the bis-bromohydrin, 15.2 g. (0.20 mole) of thiourea and 12 ml. of water is heated at 90° C. for 15 minutes. The mixture is cooled and filtered and the product is washed with acetone until the washings are essentially colorless, then dried at 50° C. under vacuum. There is obtained 9.5 g. (71% yield) of reddish-yellow, water-soluble dye.

Example II

A 1% solution of the dye of Example I is prepared in water and used to pad 80 x 80 print cloth. After an intermediate drying, a portion of the padded cloth is padded a second time with a solution of 5 g. of sodium hydroxide and 200 g. of sodium chloride per liter, then steamed for 60 seconds. A second portion of the cloth padded with the dye is also padded with the sodium hydroxide-sodium chloride solution then, without further drying, held for three minutes in an oven at 150° C. After rinsing, each of the dyed samples exhibits very good wash fastness when tested with hot alkaline soap solution.

Example III 4,6-dinitro-1-naphthylamine is diazotized and coupled into 2-naphthol. The product is reduced to the diamino compound, from which the corresponding dimercapto compound is obtained by reaction with potassium ethyl xanthate according to the procedure in Example I. The bromohydrin is obtained by reacting 0.04 mole of the dithiol so formed with 0.080 mole of epibromohydrin according to Example I.

A mixture of 6.4 g. (0.10 mole) of the bromohydrin, 10.2 g. (0.01 mole) of 2-imidazolidinethione in 8 ml. of water is stirred and heated to 95° C. for 45 minutes. After cooling, the mixture is added to 250 ml. of acetone. The precipitated product is filtered off, washed with acetone until the washings are nearly colorless, and dried at 50° C. under vacuum. There is obtained 5.7 g. (78% yield) of blue-red, water-soluble dye.

Example IV

The procedure of Example II is followed using a 1% solution of the dye of Example III. The fastness of the dyeing to soaping is once again much greater than that of the colorant from which the new dyestuff is prepared.

Example V

The procedure of Example III is repeated using 2-(2-chloro - 4 - methylphenylazo)-4-(3-bromo-2-hydroxypropylthio)-1-naphthol as a starting material. There is obtained in good yield a bluish-red dye.

Example VI

The procedure of Example III is repeated using 3'-bromo-2'-hydroxypropyl-4-(4 - dimethylaminophenylazo) naphthyl sulfide as a starting material. There is obtained in good yield a blue-violet dye.

Example VII

The procedure of Example III is repeated using 4,4'-bis(3-bromo-2-hydroxypropylthio)phenylazo - 1 - naphthalene as a starting material. There is obtained in good yield a violet dye.

Example VIII

The procedure of Example III is repeated using 1-{3-[N - (2 - tolyl)-sulfamylphenylazo]}-4-(3-bromo - 2 - hydroxypropyl)naphthalene as a starting material. There is obtained in good yield a bluish-red dye.

Example IX

The corresponding bis(bromohydrin sulfide) is prepared by reacting epibromohydrin with 1,5-dimercapto-4,8-dibenzamidoanthraquinone according to the procedure in Example I.

A mixture of 7.8 g. (0.010 mole) of the bromohydrin so formed, 5.2 g. (0.040 mole) of N,N,N',N'-tetramethyl thiourea and 5 ml. of water is stirred at 95° C. for about 25 minutes. After adding the mixture to 200 ml. of acetone, filtering off the precipitated product, and washing it with acetone until the washing is nearly colorless, the product is dried at 50° C. under vacuum. There is obtained 7.5 g. (82%) of reddish-brown-colored dye.

Example X

The procedure of Example II is followed using a 1% solution of the dye of Example IX. The fastness of the dyeing to soaping is once again much greater than that of the colorant from which the new dyestuff is prepared.

Example XI

A mixture of 7.6 g. (0.10 mole) of thiourea, 7 ml. of water, and 9.9 g. (0.020 mole) of the bromohydrin prepared from 1-mercapto-4-benzamidoanthraquinone according to the procedure in Example I, is stirred at 95° C. for 15 minutes. After cooling, the mixture is added to 250 ml. of acetone. The precipitated product is filtered off, washed well with acetone and dried at 50° C. under vacuum. There is obtained 9.5 g. (83% yield) of orange-colored dye.

Example XII

The procedure of Example II is followed using a 1% solution of the dye of Example XI. The fastness of the dyeing to soaping is once again much greater than that of the colorant from which the new dyestuff is prepared.

Example XIII

The procedure of Example XI is repeated using 3'-bromo-2'-hydroxypropyl-2-acetamino - 4 - anthraquinonyl sulfide as a starting material. There is obtained in good yield an orange dye.

Example XIV

The procedure of Example XI is repeated using 1,8-diamino-4,5-bis(3 - bromo - 2 - hydroxypropylthio)anthraquinone as a starting material. There is obtained in good yield a brown dye.

*Example XV*

The procedure of Example XI is repeated using 4,6-bis (3-bromo-2-hydroxypropylthio) - 1,9 - anthrapyrimidone as a starting material. There is obtained in good yield a yellow-red dye.

*Example XVI*

The procedure of Example XI is repeated using 3,3'-bis(3-bromo-2-hydroxypropylthio)indanthrone as a starting material. There is obtained in good yield a green-blue dye.

*Example XVII*

The procedure of Example XI is repeated using 4,12-bis(3-bromo-2-hydroxypropylthio)pyranthrone as a starting material. There is obtained a good yield a red dye.

*Example XVIII*

A mixture of 10.2 g. (0.10 mole) of 2-imidazolidinethione, 10 ml. of water, and 9.5 g. (0.020 mole) of the bromohydrin prepared by condensing epibromohydrin with 4'-mercapto-2,4,6-trinitrodiphenylamine according to the procedure in Example I, is stirred at 95° C. until a sample is soluble in water. The mixture is cooled, added to 300 ml. of acetone and the precipitated product is filtered off. After washing it with acetone and drying it at 50° C. under vacuum, there is obtained 9.2 g. (80%) of orange-colored dye.

*Example XIX*

The procedure of Example II is followed using a 1% solution of the dye of Example XVIII. The fastness of the dyeing to soaping is once again much greater than that of the colorant from which the new dyestuff is prepared.

*Example XX*

Copper tetra (4) mercaptophthalocyanine is reacted with epibromohydrin according to the procedure in Example I to give the tetra(bromohydrin sulfide).

A solution of 0.40 mole of thiourea in water is reacted with 0.010 mole of the tetrabromohydrin at 95° C. After adding the cooled reaction mixture to 300 ml. of acetone and washing the precipitated product with fresh portions of acetone, then drying at 50° C. under vacuum, a blue dye is obtained in excellent yield.

*Example XXI*

The procedure of Example II is followed using a 1% solution of the dye of Example XX. The fastness of the dyeing to soaping is once again much greater than that of the colorant from which the new dyestuff is prepared.

*Example XXII*

At 25° C., cotton yarn is immersed in a bath containing 2% (on the weight of the goods) of the dye prepared according to Example I. Sodium chloride (150% on the weight of the goods) is added and the bath is raised to 60° C. during one hour. During this time a total of 24% (on the weight of the goods) of trisodium phosphate is added gradually. The dyed yarn is rinsed, soaped and dried. It exhibits very good wet fastness.

*Example XXIII*

Wool yarn is dyed for one hour at 88° C. in a 1:30 dyebath containing 10% of sodium carbonate (on the weight of the goods) and 2% of the dye prepared in Example I. After rinsing, the dyed material exhibits very good wet fastness.

Alternatively the yarn is immersed for one-half hour at 88° C. in a 2% solution of the dye prepared in Example I. There is then added 37% (on the weight of the goods) of 85% formic acid and the dyeing is continued for another one-half hour. After rinsing, the goods are treated for one-half hour at 88° C. with a solution containing one gram of soap and four grams of soda ash per liter. The goods are rinsed and dried. The dyed yarn possesses very good wet fastness.

*Example XXIV*

Nylon yarn is dyed according to the procedures of Example XXIII. Once again, surprisingly good wet fastness is exhibited by the dyed goods.

We claim:
1. A dyestuff of the formula:

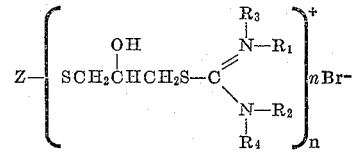

wherein Z is a water-insoluble dyestuff moiety selected from the group consisting of azo, anthraquinone, phthalocyanine and nitro; $R_1$ and $R_2$, as individual substituents, are members selected from the group consisting of hydrogen and lower alkyl and, taken collectively, represent an alkylene bridge having from 2 to 3 carbon atoms, said bridge connecting the N atoms to which $R_1$ and $R_2$ are attached; $R_3$ and $R_4$ are members selected from the group consisting of hydrogen and lower alkyl; and $n$ is an integer having a value of from 1 to 4.

2. A dyestuff of claim 1, wherein Z is azo, $R_1$, $R_2$, $R_3$ and $R_4$ are hydrogen and $n$ is one.

3. A dyestuff of claim 1, wherein Z is anthraquinone, $R_1$, $R_2$, $R_3$ and $R_4$ are hydrogen and $n$ is two.

4. A dyestuff of claim 1, wherein Z is phthalocyanine, $R_1$, $R_2$, $R_3$ and $R_4$ are hydrogen and $n$ is four.

5. A dyestuff of claim 1, wherein Z is nitro, $R_1$, $R_2$, $R_3$ and $R_4$ are hydrogen and $n$ is one.

References Cited in the file of this patent
UNITED STATES PATENTS

| | | |
|---|---|---|
| 2,645,641 | Renfrew et al. | July 14, 1953 |
| 2,664,427 | Randall et al. | Dec. 29, 1953 |
| 2,829,129 | Semmens et al. | Apr. 1, 1958 |